United States Patent Office 3,065,058
Patented Nov. 20, 1962

---

3,065,058
STABILIZATION OF SULFUR TRIOXIDE
Randolph Perry, Jr., Brentwood, and Kenneth J. Shaver, Kirkwood, Mo., assignors to Monsanto Chemical Company, St. Louis, Mo., a corporation of Delaware
No Drawing. Filed Sept. 16, 1957, Ser. No. 683,971
4 Claims. (Cl. 23—174)

This invention relates to the stabilization of liquid sulfur trioxide and high strength oleum.

Sulfur trioxide is known to exist in three different modifications—namely, a gamma modification melting at about 16.8° C., a beta modification melting at about 32.5° C., and an alpha modification melting at about 62.3° C. Upon standing at temperatures below about 27° C., especially in the presence of even very small amounts of moisture, the low melting gamma modification rapidly polymerizes to one or both of the higher melting beta or alpha modifications. Since sulfur trioxide is much more readily handled and used in the liquid gamma modification, it is an object of this invention to provide novel stabilizing compounds which, when incorporated into sulfur trioxide, will substantially retard or eliminate the conversion of gamma sulfur trioxide to either of the higher melting beta or alpha sulfur trioxides—even in the presence of substantial quantities of moisture.

We have now found that the foregoing formation of higher melting modifications of sulfur trioxide can be minimized, and the lower melting gamma modification effectively stabilized, by the presence of minor amounts of compounds of the following class:

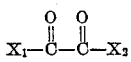

wherein $X_1$ and $X_2$ are members of the group consisting of methoxy and ethoxy radicals. Thus the stabilizing compounds of this invention comprise dimethyl oxalate; diethyl oxalate; and ethyl methyl oxalate. Of the foregoing stabilizing compounds, dimethyl oxalate is particularly outstanding. Consequently its use constitutes a preferred embodiment of the present invention.

The present sulfur trioxide stabilizers are effective in minor concentrations, generally less than about 5 wt. percent of the sulfur trioxide. The proper concentration to be used under any particular circumstances will depend upon the specific stabilizer selected, the degree of stability desired, and the amount of moisture present (or likely to become present) in the sulfur trioxide—but in general an adequate concentration will fall between about 0.1 wt. percent and about 2 wt. percent of the sulfur trioxide.

Further details of the invention will be readily apparent from the following example, which completely describes and illustrates the effectiveness of various specific embodiments of this invention.

EXAMPLE

Sealed vials of $SO_3$ containing known concentrations of $H_2O$ (added as sulfuric acid) and stabilizer were allowed to stand at room temperature for about 16 hours, cooled to 0° C. and held for another 16 hours, and then allowed to stand at room temperature for about 6 hours—after which time the percent of solid sulfur trioxide remaining in the vial was noted. The foregoing cycle of freezing and thawing was repeated three more times, the percent solids being observed after each cycle. The results of the foregoing test is set forth in the following table:

*Table*

| Stabilizer | | $H_2O$ Conc., Wt. Percent | Solids Conc., wt. percent after Freezing and Thawing | |
|---|---|---|---|---|
| Compound | Conc., Wt. Percent | | 1 Cycle | 4 Cycles |
| Dimethyl oxalate | 0.75 | 0.015 | 0 | 0.1 |
| None | | 0.005 | 100 | 100 |

What is claimed is:

1. A composition of matter comprising liquid sulfur trioxide having had added thereto a minor amount less than about 5 weight percent of a compound of the following class:

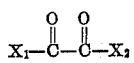

wherein $X_1$ and $X_2$ are members of the group consisting of methoxy and ethoxy radicals.

2. A composition of matter comprising liquid sulfur trioxide having had added thereto between about 0.1 and about 2 wt. percent of a compound of the following class:

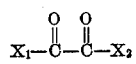

wherein $X_1$ and $X_2$ are members of the group consisting of methoxy and ethoxy radicals.

3. A composition of matter comprising liquid sulfur trioxide having had added thereto between about 0.1 and about 2 wt. percent of dimethyl oxalate.

4. A composition according to claim 3 containing not more than about 0.015% by weight of water.

References Cited in the file of this patent

UNITED STATES PATENTS

| 2,716,593 | Litant | Aug. 30, 1955 |
| 2,826,483 | Fohanno | Mar. 11, 1958 |
| 2,832,671 | Shaver | Apr. 29, 1958 |

FOREIGN PATENTS

| 735,836 | Great Britain | Aug. 30, 1955 |
| 1,130,571 | France | Oct. 1, 1956 |